Nov. 14, 1967     P. C. DRIVER ET AL     3,352,965
METHOD AND MEANS FOR ENHANCING CAMOUFLAGED TARGET
DETECTION UTILIZING LIGHT POLARIZATION TECHNIQUES
Filed March 9, 1964     3 Sheets-Sheet 1
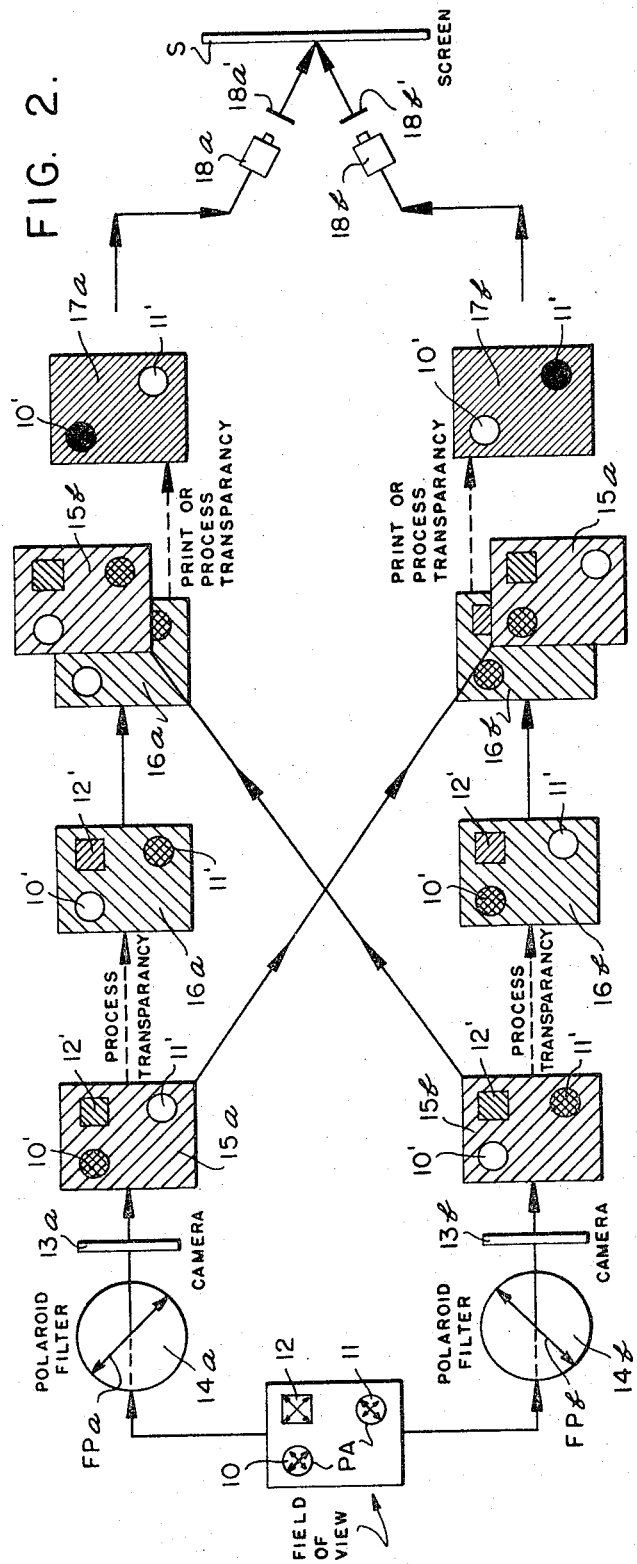
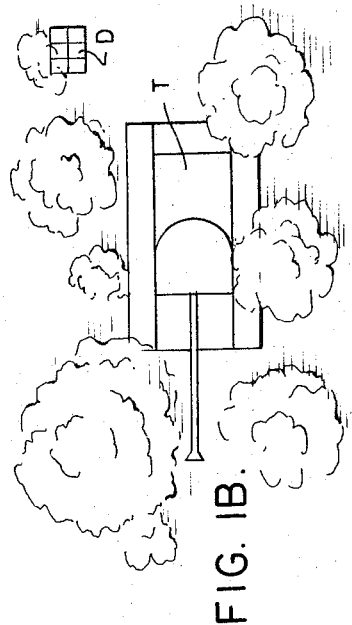
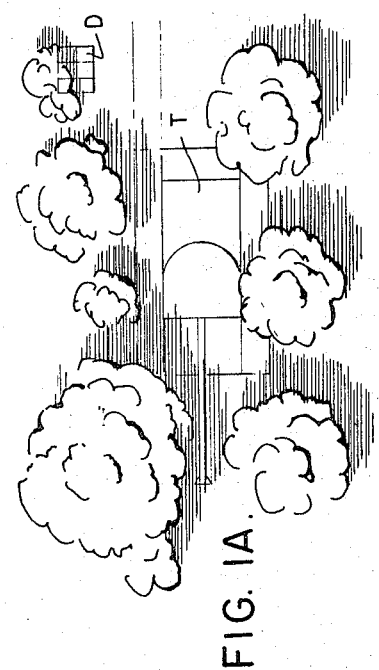
INVENTORS.
PAUL C. DRIVER
ROBERT E. FOWLER
BY
*P. H. First*
ATTORNEY.

Nov. 14, 1967    P. C. DRIVER ET AL    3,352,965
METHOD AND MEANS FOR ENHANCING CAMOUFLAGED TARGET
DETECTION UTILIZING LIGHT POLARIZATION TECHNIQUES
Filed March 9, 1964                      3 Sheets-Sheet 2
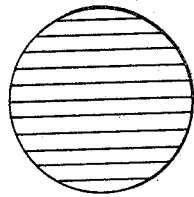
FIG. 6.
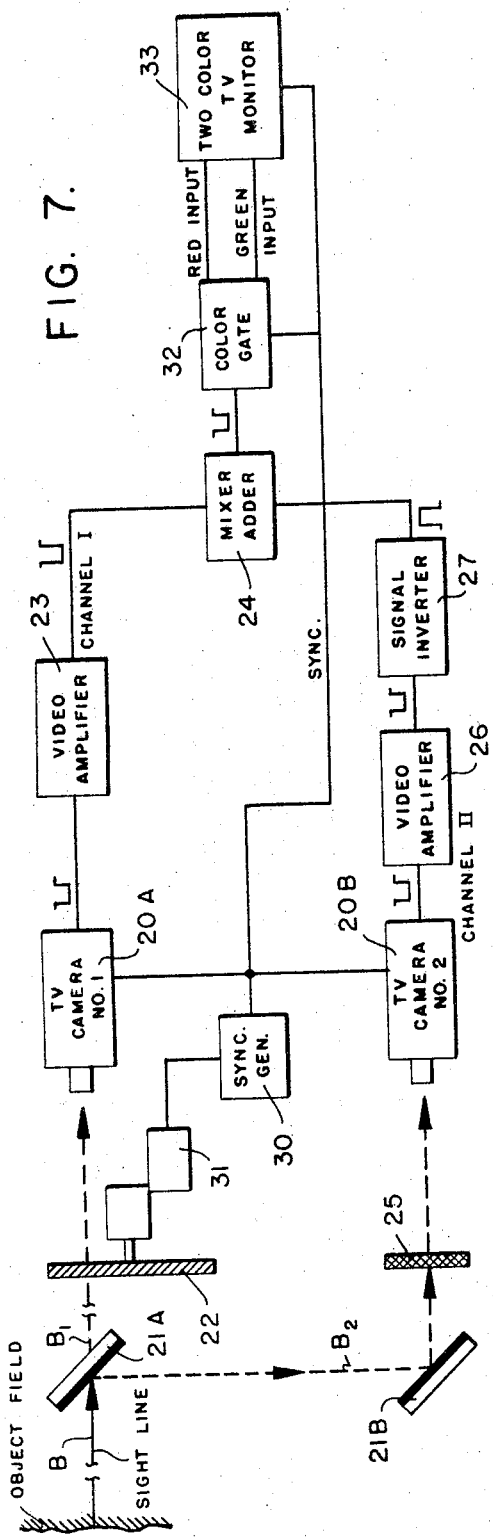
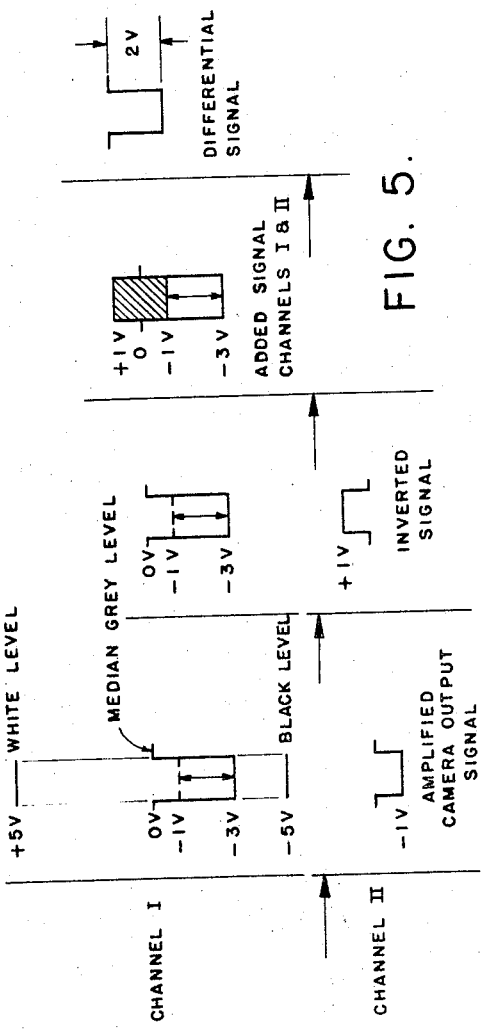
INVENTORS.
PAUL C. DRIVER
ROBERT E. FOWLER
BY
*P. H. Firaht*
ATTORNEY.

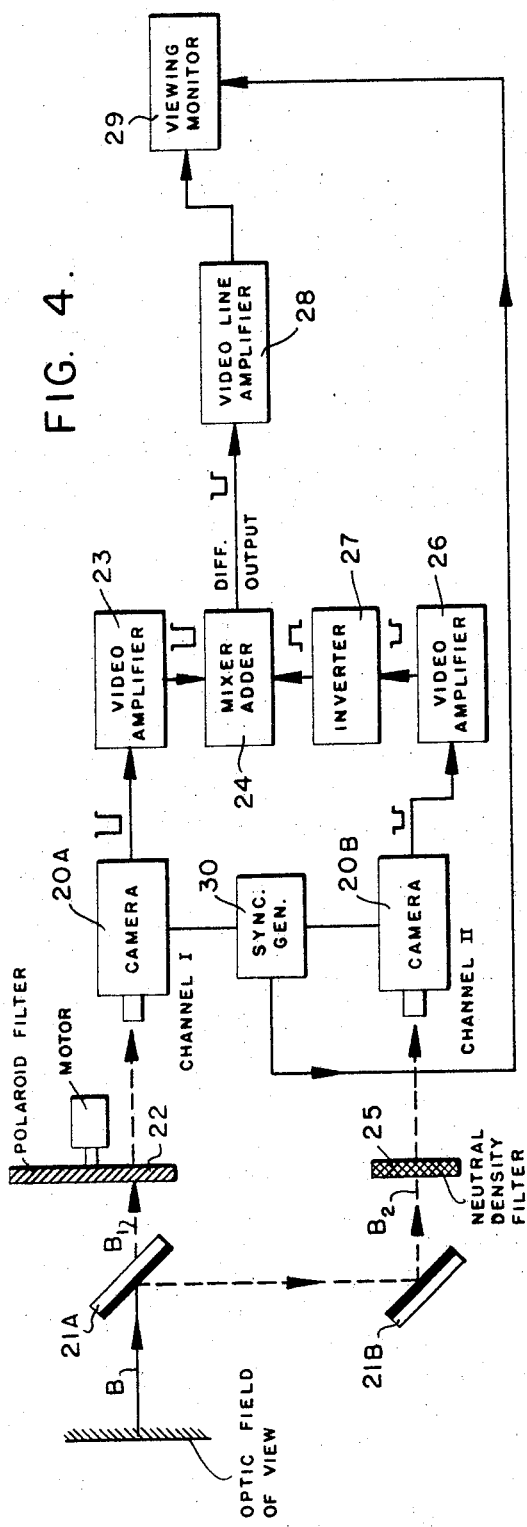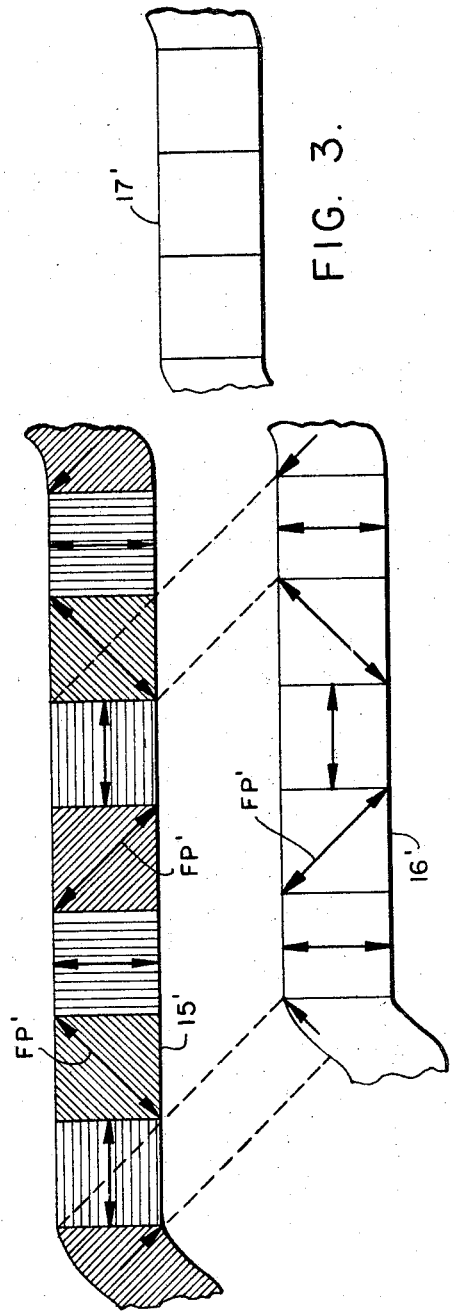

United States Patent Office 3,352,965
Patented Nov. 14, 1967

3,352,965
METHOD AND MEANS FOR ENHANCING CAMOUFLAGED TARGET DETECTION UTILIZING LIGHT POLARIZATION TECHNIQUES
Paul C. Driver and Robert E. Fowler, China Lake, Calif., assignors to the United States of America as represented by the Secretary of the Navy
Filed Mar. 9, 1964, Ser. No. 350,949
16 Claims. (Cl. 178—6)

The invention described herein may be manufactured and used by or for the Government of the United States of America for governmental purposes without the payment of any royalties thereon or therefor.

The present invention relates to a method and means for detecting a camouflaged subject of interest, and more particularly to a method and means for enhancing target detection and identification through the utilization of reflected light polarization characteristics.

Those concerned with problems of military reconnaissance and/or weapons delivery have long recognized the need for simple target detection and identification techniques which afford early target acquisition and rapid identification while employing a minimum of procedures for obtaining optimum results. This need is accentuated in areas of warfare which necessitate high-speed reconnaissance and surveillance for acquiring enemy target information.

Various methods of military target camouflage are presently practiced utilizing systems which may obscure a target by providing redundant information as background clutter for confusing conventional detector systems. For example, infrared detection techniques may be effectively countermeasured through the use of heat reflecting points and decoys deployed relative to a target so as to establish target background clutter of such proportions as to render the target indistinguishable from its background. Effectiveness of heretofore practiced photographic detection techniques, likewise, may be severely limited through the use of paints and other devices which necessitate extensive camera manipulation and film processing operations in order to detect a target disposed within a cluttered background.

Furthermore, when utilizing the unaided human eye as a detector to acquire a target in a cluttered background, the detector receives much more information than may be readily assessed or interpreted by a human brain in a limited period of time, since the presence of background clutter or redundant information leads to confusion. Therefore, in a scene viewed, directly or indirectly, a desired target may escape detection even though it is visually present.

In order to accommodate rapid target detection and identification, sufficient, but not excessive information must be received and presented to an observer in the form of a target image, although the image need not resemble in all respects the target as directly or visually observed. This requirement necessarily involves extensive reduction in background clutter, or extraneous background detail, particularly in instances where given targets are partially concealed or camouflaged so as to blend with their surroundings.

Optimum enhancement of target preceptibility requires some form of psychological impact for drawing an observer's attention immediately to a target within a scene, or optical field of view, being viewed directly or in replica. To be acquired at all, a target must fundamentally possess detectable characteristics which differ substantially from characteristics possessed by background or environmental objects. For example, a man-made subject of interest, or target, such as, for example, a military tank, may be so painted, or otherwise camouflaged, as to blend with its environmental background, whereby conventional optical detection techniques may become extremely inefficient, or even valueless. However, should the tank possess certain distinguishing characteristics, which establish detectable contrasts between the target and its background, detection and identification may be facilitated.

It has been found through experimentation that man-made objects ordinarily possess a surface, or number of surfaces favorably oriented to reflect partially polarized light with the electric vectors thereof having certain angles and magnitudes, while surrounding naturally occurring objects, such as rocks, trees, and the like, have surfaces reflecting partially polarized light having an electric vector characterized by an angle and magnitude significantly differing from that of the man-made objects. Hence, in most cases a difference in reflected light characteristics ordinarily exists between a target and its background. However, the human eye inherently lacks the ability to detect and distinguish the polarization characteristics of light. Therefore, in order to detect a given target, the eye is forced to rely primarily upon contrasts in the reflected light intensity and color characteristics. For this reason, camouflage means serve to obscure a target from visual detection, even though distinguishing differences in polarization characteristics are present.

Therefore, the purposes of the present invention is to provide a method and means for enhancing target detection and identification, through the utilization of polarization characteristics of reflected electromagnetic radiation, whereby a target may be displayed with significant contrast against a background of diminished detail.

On object of the present invention is to provide a method and means for facilitating target detection and identification by detecting polarization contrasts existing between light reflected from a target and its background.

Another object of the present invention is to provide a method for presenting a visual display with undesired background detail substantially subdued.

Yet another object is to provide a method for presenting a visual display of an optical field of view, wherein certain polarized light reflecting subjects are presented in significant contrast with respect to certain other subjects reflecting light possessing contrasting polarization characteristics.

Still another object is to provide a method and means, which utilizes polarization characteristics or reflected electromagnetic energy, e.g., light, for presenting a target image which undulates, or flickers, with respect to its background.

A further object is to provide a method which utilizes polarization characteristics of reflected electromagnetic radiation for detecting and identifying military targets.

Yet a further object is to provide a method and means for facilitating detection and identification of man-made targets through the use of reflected electromagnetic radiation polarization characteristics to provide a color contrasting visual display wherein subjects in interest, reflecting polarized light rays having given characteristics, are presented in color contrast with respect to subjects reflecting light having contrasting polarization characteristics.

Other objects, advantages and novel features of the invention will become apparent from the following detailed description of the invention when considered in conjunction with the accompanying drawings wherein:

FIGS. 1–A and 1–B comprise contrasting views of an air-to-ground scene, illustrating contrasts achieved when the scene is observed utilizing the method and means of the instant invention;

FIG. 2 is a schematic view of a flow diagram for photographically practicing the method of the present invention;

FIG. 3 is a partial schematic view illustrating a portion of a flow diagram as used to form a motion photography composite;

FIG. 4 is a block diagrammatic view of an electronic system for presenting a black-and-white visual reproduction of an optical field of view;

FIG. 5 is a graphic view illustrating a series for electronic signal processing steps, as performed by the system of FIG. 4;

FIG. 6 is a schematic view of a typical polarizer utilized in the present invention illustrating orientation of the polarizing axis; and FIG. 7 is a block diagrammatic view of an electronic system for presenting a visual display as a color contrasting reproduction of a field of view containing subjects of interest.

Referring now more specifically to the drawings, wherein like reference characters designate like or corresponding parts throughout the several views, there is illustrated in FIGS. 1-A and 1-B a target T comprising a military tank, or like subject along with its supply dump D, disposed within a background of trees, grass, and rocks, which are ordinarily present in nature and which may be utilized to provide partial concealment and/or camouflage for such targets. As a practical matter, such targets are sometimes painted a selected variegated color for causing the target to blend with the naturally occurring colors present in the background or terrain. Hence, where the target is disposed within a complex background, and/or is partially covered with natural objects common to major portions of the background, as illustrated in FIG. 1-A, the target tends to blend with the background and becomes less distinguishable to the unaided human eye.

However, when the scene is reproduced, according to the teaching of the instant invention as illustrated in FIG. 1-B, extraneous and distracting background images, or clutter, may be substantially subdued or reduced with the target image being presented in detectable contrast with respect to its background. Although FIGS. 1-A and 1-B illustrate a military air-to-ground detection problem, the same principles and techniques disclosed herein may be utilized in solving various ground-to-ground, air-to-air, and ground-to-air target detection and identification problems.

In ground-to-air and air-to-air detection, one may expect on a clear day to encounter background sky light having maximum polarization when one's line of sight is oriented approximately ninety degrees from the direction of the sun, and minimum polarization is observed at approximately zero or 180 degrees with respect to the sun. Hence, a detectable contrast between the target and its background may be predicted on the basis of known background polarization characteristics. Furthermore, it is entirely feasible to distinguish a subject of interest when observed against a sky background, due to the simple fact that there will exist a polarization contrast between light reflected from the target and its background.

Photographic display

Turning now to FIG. 2, the present invention may be performed utilizing special photographic processes, as illustrated by the flow diagram. For purposes of simplifying illustration, a scene, or field of view, may be assumed to contain three types of total reflecting or semi-reflecting surfaces 10, 11 and 12, each being capable of reflecting light having a different polarization characteristic, as indicated by the arrows PA, which designate predominant angular orientation of the electric vectors for each of the surfaces. If radiation is either elliptically or linearly polarized, the predominant axis of polarization will, at a particular time, have a specific angular orientation with respect to given detectors, such as, for example, a pair of aligned cameras 13a and 13b. If the surface reflected is non-polarized or circularly polarized, there will exist no preferred or predominant axis of polarization. In any case, the polarization characteristics of received radiation are intimately related to the physical characteristics of each of the reflecting surfaces and to their relative physical orientation with respect to the cameras and sources of illumination.

The polarization characteristics of the received light or radiation is the basic source of information. Therefore, a pair of polarized light sensing elements, or linear polarizers 14a and 14b sensitive to the axis of polarization may be utilized to interrupt the surface reflected light beams and segregate the incident rays according to their polarization characteristics. The only components of the collected rays which will be transmitted are those possessing electric vectors disposed parallel to the transmission axis of the polarizers. It is here to be noted that the linear polarizers 14a and 14b are intrinsically capable of blocking at least 50% of the incident unpolarized radiation and may be of the type commonly referred to as linear Polaroid filters. The polarizers may be so disposed adjacent to the lens of the cameras 13a and 13b, respectively, as to pass thereto only those components of incident light rays that are angularly orientated in a direction predetermined by the orientation of the axes of polarization of the Polaroid filters, as illustrated by arrows $FP_a$ and $FP_b$. The axes of polarization $FP_a$ and $FP_b$ of polarizers 14a and 14b, are arranged ninety rotational degrees apart and thus all components of the incident light rays passed by one filter are blocked by the other filter, and vice versa. While substantially all light rays are passed by the combination of the two filters, each filter will pass only that part of the light that is properly oriented with respect to the filter's axis of polarization, or transmission axis. Therefore, in the case of unpolarized light, each filter will pass approximately 40% of the incident light since transmission losses of from 5 to 15% may occur due to reflection and absorption in the filter material.

Each of the cameras 13a and 13b are of conventional design, hence, a detailed description thereof is omitted in the interest of brevity. However, it is to be understood that the cameras are to be so aligned and focused as to photograph the same scene and are synchronously operated so as to simultaneously expose one or more frames on conventional photosensitive photographic film material, whereby a pair of photographic negatives 15a and 15b may be obtained exhibiting identical fields of view. For example, each of the negatives 15a and 15b will contain an identical image 12'. However, each negative will contain only a single image, 10' or 11', due to the blocking of the light components reflected from the surfaces 10 and 11 that are cross polarized with the transmission axis of the Polaroid filter. For example, negative 15a will contain image 10', appearing dark, while the negative 15b will be void of an image 10', which will appear as a blank or light area on negative 15b. An opposite effect is achieved with respect to the image 11'. The negatives 15a and 15b are next processed by carefully controlled conventional photographic film processing techniques thus providing a pair of positive transparencies 16a and 16b having contrasting light and dark areas.

As is the case in conventional photographic processing, each of the image defining light and dark areas of the negatives 15a and 15b will appear in the positives 16a and 16b as reversed dark and light areas, with respect to the similar areas on the negatives, and at predetermined gray scale levels. Therefore, by stacking, or superimposing and registering a negative transparency, obtained through a first camera, with a positive transparency, obtained through a second camera, a "stacked" arrangement, hereinafter referred to as an overlay, may be obtained. When printing through the overlay, complimentary light and dark areas will tend to cancel each other and thus be reproduced at a predetermined nominal or average gray scale level, while non-complimentary light and dark areas will be added. Hence, it is to be particularly noted that by superimposing and registering the negative transparency 15a with the positive transparency 16b, and the negative transparency 15b with the positive transparency 16a, a pair of registered printing overlays will thus be formed with the complimentary reversed light and dark images 12' of each overlay being in a superimposed and registered relationship. While each of the images 10' and 11' are superimposed and registered, they are non-complementary, therefore the images 10' and 11', on both the negative and the positive transparencies, appear as either light or dark areas. When the images are registered in the overlay, so that the light areas are superimposed and the dark areas are superimposed, they will add on printing, to form one image that is lighter and one that is darker than the image 12'. A pair of composites 17a and 17b are thus obtained upon printing through each of the overlays in conventional fashion, with the image 12' substantially canceled therefrom.

When the composite 17a is compared with the composite 17b each composite will comprise a photographic print containing identical image defining areas, but in a reversely contrasting light and dark image presentation. The images 10' and 11' in the composite scene result from unequal exposure of the respective negatives, due to unequal transmission of the polarized rays through the filters, and are readily discernible. The image 12', resulting from equal film exposures due to components of the unpolarized light being equally passed by the respective filters, will be substantially canceled from the composites 17a and 17b, so that the image 12' now possesses a neutral density corresponding to the unpolarized background and presents little contrast. Therefore, each of the resulting composites 17a and 17b comprises a print containing images of those objects in the field of view having surfaces which reflect partially polarized light and with the images of surfaces which reflect predominantly unpolarized light essentially canceled therefrom.

This technique can also be applied to motion photography by using a slowly rotating polarizing filter or polarizer, synchronized with the shutter mechanism of a single camera in a manner such that each exposed frame of a photosensitive film strip is exposed through the rotating polarizer at successive points in time as the polarization axis of the linear polarizer is advanced through successive increments of rotation, such as, for example, increments of 45 degrees, as indicated by arrows FP', FIG. 3. The polarizer may be continuously rotated or may be stepped in synchronism with film movement in the camera. In this case the film strip is processed to provide a motion picture negative 15', FIG. 3, which is then processed to provide a photographic positive transparency 16' in strip form, in a manner similar to that disclosed with respect to the processing of photographic negatives and positives 15a–16b. The positive transparency 16', generally speaking, corresponds to positive 16a and is superimposed with the frames of its negative to form an overlay, similar to the aforementioned overlays, with the frames thereof being superimposed and registered so that the positive and negative frames of the overlay are linearly displaced to correspond to a relative angular displacement of ninety rotational degrees of the respective polarizer axis as illustrated by arrows FP'.

A composite transparency 17' may now be processed from the thus formed overlay by printing therethrough in a manner similar to that utilized to provide composites 17a and 17b. When projected as a motion picture on a screen, the images resulting from the polarized components of light reflected from the surfaces of the original scene will appear to scintillate or flicker thus providing a visual display with a dynamic effect. This effect is optimized by operating the projector at a suitable rate, and serves as an additional aid for target detection and perceptibility by immediately drawing an observer's attention to the particular portion of the display which contains the desired subject image.

Further enhancement of target versus background discrimination can be obtained by color translation of target information in visual display form, whether still or motion photographic techniques are used. Where still photographic techniques are used, the display may be effected through a simultaneous or dual projection of the composites 17a and 17b through contrasting color filters, such as red and green filter elements of conventional design. In such instances the composites 17a and 17b are produced through processing the superimposed photographic negatives and positives 15b, 16a, and 15a and 16b, respectively, to provide composites in the form of transparencies for rendering the composites adaptable to screen projection. The images of each composite are projected on a screen S, FIG. 2, through filters in a manner such that the scene contained in one composite registers with the scene of the other composite, whereby resulting screen displayed images will appear in a contrasting color display. For purposes of illustration, it may be assumed that a first projector 18a, FIG. 2, having a red filter 18a' is utilized for projecting the composite 17a on a screen S so that the image 11', for example tank T, will appear to possess a red color as it is displayed. A second projector 18b, having a green filter 18b', is used to project the composite 17b on the screen S so that the image 10', for example dump D, will be caused to be displayed having a green color. As the two composites are simultaneously displayed on the screen S, a color contrast between the images 10' and 11' is readily detectable. The colors of polarized objects are quite saturated because the image of 11' on composite 17b is very dark so only saturated red appears on the screen to show an image of 11'. The neutral background will appear as yellow from blending of the red and green. When using this technique the image of tank T, FIG. 1–B, may be projected in a first predominant color with certain background objects, such as a dump D, for example, being displayed in a second predominant color, and the substantially unpolarized background being displayed in a mixture of red and green to appear as a shade of yellow.

It is to be noted that in motion photography, a dynamic display may be obtained in color contrast through dual motion projection to thus provide an image color and intensity "flicker" as well as background contrast for thus further enhancing target detection. However, where dual motion projection is desired, it becomes necessary to provide a pair of composite transparencies. It is entirely feasible to provide a pair of identical composites processed by utilizing a single negative and its positive, each being formed in a manner similar to that necessary for forming composite 17'.

When utilizing a dual motion photography projection display, the aforementioned pair of composites are simultaneously projected on the screen in a manner similar to that described in conjunction with the description of a dual projection of the still composites 17a and 17b, but with corresponding frames of the composites being displaced by an amount corresponding to 90 degrees of polarizer rotation. Such a display may be attained utilizing conventional projector and screen facilities. Also, it should be noted that the dual projectors must be synchronized.

It is to be understood that other means may be employed which provide similar results through the projection of a single composite. For example, a sectored multicolor filter disk may be rotated in synchronism with frame projection to sequentially display objects of interest in contrasting color.

To summarize the foregoing, it may be stated that in order to provide a photographic reproduction of the area wherein the target image will be readily detectable, the scene, or field of view, may be simultaneously photographed through separate cameras focused through separate polarizers arranged so as to have their polarization axes angularly displaced with respect to each other. In processing the exposed film, first and second photographic negative transparencies are obtained and processed to provide first and second positive transparencies. The first negative transparency is registered with the second positive transparency, while the second negative transparency is registered with the first positive transparency to form a pair of overlays. The overlays are now processed to provide a pair of composite photographs or transparencies containing primarily only those images possessing surfaces which reflect light rays having selected polarization characteristics. The images resulting from surface reflected light having essentially unpolarized characteristics are substantially canceled upon the printing of the composites, since these images are registered in superimposed relationship in the overlay and are present at complementary gray scale levels.

When desired, the scene of each composite may be projected on a screen so as to register with the scene of the other composite. Further, the separate scenes may be projected through separate color filters to provide a display with contrasting colors.

Where motion photography is utilized, the polarization axis of the polarizer constantly shifts, or angularly rotates, to a new position before photograhpically exposing a new frame. A composite transparency is then produced by processing the negative and its positive to form an overlay and composite which may be projected on a screen to exect a dynamic display wherein the images undulate or "flicker" due to the rotation of the polarizer which, in effect, is achieved through light modulation. It is to be noted that a single negative and its positive, the frames of which have been superimposed at different positions with respect to the frames of the negative, may be used to form a pair of overlays for providing a pair of separate composites. These composites may now simultaneously be projected on a screen through various color filters to provide a dynamic display with color contrast.

*Electronic display*

In many instances it is desirable to utilize an electronic or video transmission circuit for converting raw field of view information to a visual display, wherein undesired information or intelligence of a distracting nature may be substantially canceled from the display, or reduced to an acceptable level, whereby the contrast between a target and its background is enhanced. Such conversion is made possible through the use of an unique electronic system so designed as to utilize commercially available electronic circuit components.

The aforedescribed photographic techniques or processes may be electronically simulated so that target information may instantaneously be made available. The electronic system of the present invention makes use of a pair of conventional television cameras 20A and 20B so interconnected so as to function as a synchronized camera unit serving to provide output signals in pairs, which are subsequently combined to provide a differential input signal to an electronic display unit.

More specifically, the electronic system of the present invention is provided with a conventional beam splitting mirror or prism 21A, FIG. 4, and a front surface mirror 21B, which function to divide a received beam of light B into first and second beams of light $B_1$ and $B_2$, respectively. Each beam $B_1$ and $B_2$ may contain both polarized and unpolarized light components. The mirrors 21A and 21B are so disposed as to direct the beams $B_1$ and $B_2$ along paths extending through suitable optic systems present in the cameras 20A and 20B. The cameras 20A and 20B may comprise any one of several well known devices, for example, each of the cameras may be of a type utilizing a vidicon tube or image orthicon.

Disposed so as to interrupt beam $B_1$, there is arranged a Polaroid filter 22, of the type diagrammatically illustrated in FIG. 6, which is rotated by an electrically driven motor, or other suitable means, so that it functions to pass incident light rays having both unpolarized and linearly polarized components with the intensity of the polarized components being varied periodically and the intensity of the unpolarized components being maintained constant, during rotation of the transmission axis of the polarized filter 22. This variation is achieved due to the fact that during rotation, the polarizer serves to pass maximum quantities of polarized light components when their electric vectors are parallel to the transmission axis of the polarizer and minimum quantities of polarized components when their electric vectors are disposed at right angles to the transmission axis of the polarizer. Hence, linearly polarized light is substantially blocked twice per revolution of the polarizer. For linearly polarized light incident on a continuously rotating polarizer the intensity of the transmitted flux is a cosine squared function of the angle between the transmission axis of the polarizer and the plane of polarization of the incident light. The pick-up tube of the camera 20A serves to conventionally convert ray borne image information to intelligence in the form of a series of electronic pulses. These pulses are fed through a first electronic channel, CHANNEL I, FIGS. 4 and 5, to a first video amplifier circuit 23, of suitable design capable of providing signal amplitude amplification for purposes of providing a series of working signals. The working signals are fed directly to a mixer-adder circuit 24, also of any suitable design. As adder circuits are well known, a detailed description thereof is omitted in the interest of brevity. However, its function will hereinafter be more fully set forth.

As beam $B_1$ is being treated in the foregoing manner, beam $B_2$ is being fed through a neutral density filter 25, which serves to reduce the intensity of the beam of light as it is directed to camera 20B of a type similar to that of camera 20A. The transmission factor of this filter is selected to adjust the intensity of the beam received by camera 20B to approximate that of the beam received by camera 20A while observing a homogeneous field of unpolarized light. However, similar effects may be achieved merely by altering the reflection characteristics of the various mirrors employed.

It is to be understood that the light rays focused on the pick-up tube of camera 20B comprises "total" light, viz., all of the beam components irrespective of polarization characteristics. Therefore, camera 20B serves to convert "total" ray borne information and provide electronic output signals to a second electronic channel, CHANNEL II. Therefore, the output signals from camera 20B contain "total" subject image intelligence, regardless of the polarization characteristics of subject surface reflected light. These signals are first amplified, in a manner similar to the aforementioned electronic pulses, through the use of video amplifier 26. The amplified signals, or working signals, are fed to a conventional signal inverter circuit 27, wherein the input signals are inverted with respect to electrical polarity. Upon being inverted, the signals of CHANNEL II are fed to the mixer-adder circuit 24. The mixer-adder circuit 24, serves to combine and algebraically add the input signals originally initiated at cameras 20A and 20B, whereby unpolarized light generated signals, which are of essentially equal amplitude in each channel, are substantially canceled whereas the polarized-light generated signals (generally of unequaled amplitude) produce a net differential signal at the output of the mixer-adder circuit 24. Thus only those objects which reflect some component of polarized electromagnetic or light radiation will appear with high contrast in an electronic visual display of the scene being viewed by the cameras.

The display is achieved by feeding the differential output signals, from the mixer-adder 24, through a video line amplifier 28 to an intelligence converter or viewing monitor 29, which may be of any suitable type, for example, a kinescope may be used. A synchronizing signal generator, of sync generator, 30 serves to synchronize the operations of cameras 20A and 20B together with the system's viewing monitor in a conventional manner so that objects in the field of view, which reflect polarized light having contrasting characteristics are reproduced in the electronic visual display.

In order to provide for a clear understanding of the above-described electronic system, reference is made again to FIGS. 4 and 5. For purposes of illustration FIG. 5 depicts, for a hypothetical case, the electronic signals generated at corresponding points in CHANNELS I and II as the synchronized electron beams in the respective cameras scan across a typical contrast area in the image formed at the photo sensitive surface of the pick-up tube. It is to be understood that the signal shown represents a single pulse in a series of pulses normally produced during a single horizontal scan by the electron beam in the camera. It is pointed out that the voltages indicated in FIG. 5 are indicative of the relative brightness levels produced at the viewing monitor. It will be recalled that, in operation, the Polaroid filter or polarizer 22 is continuously rotated, therefore the quantity of surface reflected polarized light passed by the filter from any point in the object field will be caused to vary according to the angular positions of the polarizer, which serves to completely block incident linearly polarized light twice per revolution of the filter. However, the inherent characteristics of a Polaroid filter precludes passage of more than approximately 40% of the unpolarized light regardless of transmission axis orientation. Thus the unpolarized components of light, although attenuated, are continuously passed through the filter 22 without variation in intensity. As "total" light, i.e., light rays having both polarized and unpolarized components, is received at camera 20B, the scanning electron beam will produce a raw output signal from the camera 20B which, when amplified, comprises a negative one volt signal, for the case illustrated. In practice, an output pulse may comprises a positive signal, however, for purposes of illustration, the output signals are here assumed to be negative relative to zero voltage signal level which produces median gray scale level at the monitor.

When maximum light is passed by the polarizer 22, "total" light is passed producing an output from camera 20A which will comprise a signal approaching a negative one volt, as designated by dashed lines. Hence, as maximum light is passed by the filter 22, output signals of approximately equal values will be obtained from the cameras 20A and 20B. However, as the filter 22 continues to rotate to an effective position, which serves to pass a minimum quantity of light, the output signal from camera 20A approaches a maximum negative value of three volts, due to passage of minimum light. Therefore, the output signals from camera 20A will modulate or vary between a negative one volt and a negative three volts, under the influence of the polarizer or Polaroid filter 22. In other words the component of the output signals, produced by polarized light will be found in the portion of the total signal between the negative one volt and negative three volt levels or values, as indicated by arrows in FIG. 5.

For extracting desired intelligence, or that contained in the −1 v. to the −3 v. portion of the output signal from camera 20A, to provide a differential signal for driving the monitor 29, it is necessary to essentially cancel or delete non-desired intelligence contained in the zero to negative one volt portion of the total signal. Therefore, the output signal of camera 20B, as amplified, is inverted by the inverter circuit 27, to comprise a +1 v. inverter output signal. The inverter output signal is now fed to the mixer-adder circuit 24 and there combined with the output signal of camera 20A to thus electronically cancel that portion of the signal initiated by unpolarized light components. It is to be understood that the amplification of the output signals from the cameras 20A and 20B is performed in such a manner as to impart essentially equal amplification thereto, so that substantially all undesired intelligence may be canceled. It has not been found necessary, or even desirable, to completely cancel all intelligence borne by unpolarized components of the light received, viz., a slight amount of detail or contrast in the image of the background scene is of value for reference and orientation. In other words, the function of the system is to enhance target contrast and substantially subdue background detail while still maintaining useful image reference points.

In order to provide a color display at the viewing monitor, the hereinbefore described basic electronic circuits may be modified to include a plurality of color intelligence converting electronic circuits and components, FIG. 7, which employ well known principles and techniques.

When it is desired that objects of interest, i.e., targets which reflect predetermined angularly oriented polarized light, as well as any target reflecting light which has polarization characteristics contrasting with background objects, be displayed in contrasting color with their background, the basic circuit, illustrated in FIG. 4, may be provided with a polarizer synchronizing pick-off unit 31, a color gate 32, and a two-gun color monitor 33.

It suffices to understand that the synchronizing pick-off device 31 comprises a suitable circuit of known design, which serves to synchronize rotation of the polarizer 22, FIG. 7, with the operation of the cameras 20A and 20B and the color gate circuit 32. Thus as the polarizer 22 is continuously rotated or sequentially stepped through a sufficient angle (i.e., 180 degrees) reflected light rays having different polarization angular orientation may be sequentially detected by the camera 20A so that the objects of interest reflecting polarized light having characteristics which contrast with those of the background reflected light may be sequentially reproduced at the monitor 33 in contrasting colors.

The color gate 32 essentially comprises a suitable bi-stable trigger or switching circuit and means for passing the circuit from one condition to another when a predetermined rotational condition exists for the polarizer 22. Switching between the conditions of stability may be initiated by an output pulse from the sync generator 30 so that as the polarizer 22 is rotated or stepped to a new position a pulse is applied to the trigger circuit to initiate switching thereof. Therefore, it is to be understood that as the polarizer 22 is rotated, the trigger circuit alternately switches to direct the differential output signal from an input terminal of a first color gun circuit to an input terminal of a second color gun circuit, whereby the differential signal may alternately and sequentially drive a pair of color guns of the two-color monitor 33 in a predetermined manner and in accordance with selected positions of the polarizer 22.

While the monitor 33 may comprise a multiplicity of color guns, such as the well known RCA Tri-Color Kinescope or any other suitable color image reproducing system, a simple two-color gun circuit is provided for the present invention. Essentially, the monitor 33 utilizes a two-color kinescope interconnected with the output terminals of the color gate 32 through conventional circuits, not shown. The monitor 33 may also utilize conventional sweep generator circuits for driving the electron beams to produce a rectangular raster. Since the electrical components and their functions are well-known, a detailed description thereof is omitted in the interest of brevity.

It suffices to understand that each time the polarizer 22 is stepped or rotated a predetermined new position to pass polarized light rays having different angular orientation a pulse is obtained from the sync generator 30 and applied to the bi-stable trigger circuit of the color gate 32 so that the condition of the trigger circuit may be altered to conduct the mixer-adder output differential signals to a previously non-activated adjacent color-gun for thus activating the two-color guns in sequence.

It is to be understood that where the polarizer is continuously rotated through 360 degrees, there is, inherently, some degree of undesirable dilution of colors, as observed at the monitor. However, it is entirely feasible to minimize dilution of colors, as observed, for a particular angle of polarization of surface reflected light, by successively stepping the polarizer through a predetermined angle.

When operating the electronic circuit, either as a black-and-white, or a color system, the object field may be reproduced so that objects of interest therein will present a dynamic appearance thus facilitating perception. This is accomplished by controlling the rate of polarizer rotation so that as the light is modulated, whereby the images of target surfaces reflecting polarized light will be caused to "flicker" or appear to scintillate. The extent of apparent scintillation necessarily depends on the rate of polarizer rotation and the degree of linear polarization of the light reflected from the object of interest. This effect inherently aids in target detection, since the image scintillation tends to create a psychological impact on the observer thus causing his attention to be immediately drawn to display areas containing desired targets or intelligence, whereby loss of time in "searching" the display is greatly reduced.

The invention may be briefly summarized as follows:

An optic field of view containing man-made targets or subjects of interest partially concealed in a background of naturally occurring objects, such as rocks, trees and the like, is photographed utilizing either conventional chemical or electronic techniques. The optic field of view reflected light rays are filtered through at least one pre-oriented polarizer so that only polarized light rays having electric vectors disposed at predetermined angular disposition will be passed to a camera, or cameras, for converting ray borne intelligence to recordable intelligence, which may be in the form of exposed photosensitive material or electronic pulses. As the polarizers transmit unpolarized light rays, as well as those rays having electric vectors disposed in a predetermined orientation, substantial quantities of intelligence conveyed by the unpolarized light rays are canceled so that a resulting visual display will essentially comprise intelligence conveyer by the polarized light rays transmitted by the polarizers. Since the surfaces of man-made objects tend to reflect polarized light rays, and surfaces of naturally occurring objects tend to reflect unpolarized light rays, the net result is that the targets will be displayed in significant contrast with the target's background. Various methods may be utilized in displaying the visual display so that black-and-white, color, and target image undulation or scientillation may be achieved in the display.

In view of the foregoing, it is to be understood that the present invention provides a method and means for enhancing target detection, particularly where foreign objects are disposed in a cluttered background of naturally occurring objects, wherein target background detail is significantly reduced and a visual display of a target is provided in contrast with the background.

Obviously many modifications and variations of the present invention are possible in the light of the above teachings. It is therefore to be understood that within the scope of the appended claims the invention may be practiced otherwise than as specifically described.

What is claimed is:

1. A method for enhancing target detection and identification, the steps comprising:
   focusing intelligence-bearing light into beams containing nondiscriminately polarized and unpolarized light rays reflected from a selected light reflecting area containing a subject of interest;
   interrupting said beams;
   selecting from said beams unpolarized light ray and polarized light rays having a predetermined angular orientation;
   converting image intelligence borne by selected rays to recordable intelligence;
   canceling from said recordable intelligence substantially all intelligence converted from said unpolarized rays; and
   reconverting the recordable intelligence to light ray borne intelligence to provide a visual display of the light reflecting area.

2. In a method of reducing an optic field of view to a recorded visual display, the steps of:
   scanning a light reflected scene and passing scene reflected light rays containing a mixture of polarized and unpolarized light rays through of at least one optic polarizer;
   screening said light rays at said polarizer for selectively segregating the polarized rays according to their predominant polarization characteristics;
   photographically exposing at least one portion of a photosensitive film material by utilizing unpolarized and selected polarized rays, whereby scene intelligence contained in said unpolarized and selected polarized rays is recorded as discrete quantities of intelligence relating to various segments of said scene;
   essentially canceling from said quantities intelligence introduced by unpolarized rays; and
   presenting remaining intelligence as a visual display, wherein said scene is reduced to a plurality of images representing selected optic field of view intelligence as dictated by the selected polarized rays.

3. The method as defined in claim 2, further including the step of:
   projecting said recorded display through a color filter, whereby said images may be displaced in a preselected color.

4. The method of claim 2 wherein two portions of photosensitive film material are exposed utilizing a pair of optic polarizers, and said undesired intelligence is canceled through the steps of:
   processing said portions of material to provide a first and second photographic transparency;
   processing said first and second negative transparency to provide a first and a second photographic positive transparency;
   forming a first overlay by superimposing and registering the first negative transparency with the second positive transparency;
   forming a second overlay by superimposing and registering the second negative transparency with the first positive transparency; and
   printing through said first and said second overlays to provide a pair of composites comprising essentially only those images which represent intelligence introduced by polarized light rays.

5. In a method for enhancing target detection and identification the steps comprising:
   focusing scene reflected light rays to provide a beam of light;
   directing said beam to the surface of an optic polarizer;
   passing unpolarized and selectively polarized light rays through sequentially rotating said polarizer in a step-by-step fashion through predetermined increments of rotation for sequentially passing preselected polarized light rays therethrough;
   directing the light rays passed by said polarizer during successive polarizer rotational dwell periods to impinge on a strip of photosensitive material for photographically exposing a series of successive photographic frames on a continuous strip of photosensitive film;
   processing said strip to provide a continuous photographic negative transparency having successive frames, each containing a scene image reproduction as dictated by the light rays passed by said polarizer during a dwell period;

processing said negative to provide at least one photographic positive transparency;

forming an overlay with the frames of said negative and said positive transparencies longitudinally displaced with respect to each other;

processing said overlay to provide a composite having scene images introduced through unpolarized light rays substantially canceled therefrom; and projecting said composite as a motion photography display.

6. In the method defined in claim 5, further including the steps of:

forming additional composites; and simultaneously and photographically projecting images of said composites through contrasting color filters to provide registered scene images in color contrasting display.

7. A passive method for detecting and identifying targets disposed in a given scene through the use of scene reflected image information bearing light rays, the steps of:

filtering untreated scene reflected, information bearing light rays through a polarizer for obtaining light rays including unpolarized light rays and light rays having axes of polarization orientated in a predetermined angular relationship with respect to said polarizer;

converting image information borne by the thus obtained rays to quantities of image intelligence;

canceling from said quantities image intelligence initiated as unpolarized light ray borne information; and treating said quantities of image intelligence to convert said quantities of intelligence to a visual display, wherein only scene disposed objects having surfaces capable of reflecting light rays having axes of polarization oriented in a predetermined angular relationship with respect to said polarizer is reproduced in said display.

8. The method of claim 7, further characterized in that photosensitive film material is utilized for converting ray borne information to quantities of image intelligence.

9. The method of claim 7, further characterized in that said ray borne information is converted to quantities of electronic pulse intelligence.

10. In a passive method for detecting and identifying a target disposed in a cluttered background, the steps of:

filtering surface reflected light rays through a polarizer for obtaining quantities of image intelligence;

converting filtered surface reflected polarized light rays to quantities of image intelligence bearing electronic pulses;

canceling from said pulses undesired intelligence initiated through filtered nonpolarized light effects; and converting said pulses to an electronic visual display wherein the desired intelligence is presented as optic field images.

11. The method of claim 10 and further including; causing said images of said display to assume a scintillating characteristic.

12. A method of detecting a target disposed in an optic field of view, comprising the steps of:

focusing light reflected from an optic field through a polarizer device onto a camera tube of a first camera pickup unit of a television system;

converting optic field of view information, as transmitted by said polarizer device, to a first series of video output signals for a first electronic channel;

focusing said light onto a camera tube of a second camera pickup unit of said television system simultaneously with the step of focusing said light onto a camera tube of said first camera pickup unit;

converting optic field images to a second series of video output signals irrespective of light polarization;

establishing an inverted phase relationship between said first and said second series of video output signals;

combining said first and said second series of output signals in their phase inverted relationship for providing differential signals having unpolarized light effects canceled therefrom; and driving an electronic viewing monitor in accordance with said differential signals to provide an electronic visual display wherein optic field of view subjects reflecting light having desired polarization characteristics are significantly contrasted with subjects reflecting light having undesired characteristics.

13. A television system for providing an electronic visual display of an optic field of view disposed therein subjects capable of reflecting a beam of light having both polarized and unpolarized light ray components comprising in combination:

means for directing said light beam along a first and a second light beam path;

a polarizer disposed in said first path for selectively transmitting light rays having a predetermined polarization orientation;

means for converting image intelligence contained within said preselected light rays to a first series of video output signals;

means for converting image intelligence contained within said beam as it is directed along said second path to a second series of video output signals irrespective of component ray polarization;

a signal inverter for establishing an inverted phase relationship between said first and said second series of video output signals;

means for electronically adding said series of video output signals for providing a series of differential output signals;

an electronic display device; and means for driving said display device in accordance with image intelligence contained in said series of differential signals to provide an electronic image reproduction of said optic field, wherein said optic field subjects reflecting polarized light rays having a predetermined orientation are displayed in significant contrast with respect to remaining subjects of said optic field.

14. The system according to claim 13 further including a neutral density filter disposed within said second light beam path for reducing optic field light image intensity.

15. A system for detecting a target disposed in an optic field of view, comprising in combination:

a beam splitting means for causing a beam of optic field of view reflected light to be transmitted along a first and a second path;

a first camera tube pickup unit disposed in said first path for providing a first series of electronic signals;

a second camera tube pickup unit disposed in said second path for providing a second series of electronic signals;

a rotating polarizer disposed in said first path for sequentially passing polarized light rays to said camera;

means for inverting the signals of said second series of electronic signals for converting said second series of electronic signals to a series of inverted signals;

means for adding said series of inverted signals and said first series of signals to provide a series of differential signals; and means for converting said series of differential signals to an electronic display.

16. The system of claim 15 being further characterized in that said means for converting said series of differential signals to an electronic display includes:

a two-color monitor;

a color gate for driving said monitor; and a sync generator and pick-off for synchronizing polarizer rotation with the camera tube's and color gate's operation.

(References on following page)

References Cited

UNITED STATES PATENTS

| | | | |
|---|---|---|---|
| 2,384,260 | 9/1945 | Goldsmith | 178—6.5 |
| 2,501,446 | 3/1950 | Justice | 88—65 |
| 2,598,328 | 5/1952 | Willman | 88—14 |
| 2,871,759 | 2/1959 | Sconce | 88—14 |
| 2,969,537 | 1/1961 | Mannheimer | 343—5 X |
| 3,148,367 | 9/1964 | Ochiai. | |

JOHN W. CALDWELL, *Primary Examiner.*

CHESTER L. JUSTUS, *Examiner.*

G. M. FISHER, J. A. ORSINO, *Assistant Examiners.*